2,816,140

PROCESS FOR THE PRODUCTION OF OXALYL CHLORIDE

Ellsworth K. Ellingboe, Highland Woods, and Lester Russell Melby, Wilmington, Del., assignors to E. I. du Pont de Nemours and Company, Wilmington, Del., a corporation of Delaware No Drawing. Application July 1, 1955,
Serial No. 519,643

11 Claims. (Cl. 260—544)

This invention relates to a new process for the production of hydrogen-free acid chlorides and more particularly of oxalyl chloride.

Oxalyl chloride is of considerable importance due to the activity of the two chlorines. Oxalyl chloride, the most active of the organic acid chlorides, approaches in activity as a chlorinating or dehydrating agent, inorganic chlorides such as thionyl chloride or phosphorus trichloride. It is more versatile as a reagent than other organic acid chlorides. As a bifunctional acid chloride, oxalyl chloride reacts with diamines to form polyamides. It even reacts with both of the nitrogens of urea to form oxalyl urea.

Oxalyl chloride has been prepared by the use of a very large excess of phosphorus pentachloride on oxalic acid. Even under these conditions only a fair yield of oxalyl chloride is obtained. Other more conventional means of acid chloride preparation do not work with oxalic acid, presumably because replacement of one hydroxyl with chlorine gives a half acid chloride which reacts internally to subsequently produce hydrogen chloride, carbon monoxide and carbon dioxide rather than reacting in the expected manner with more of the acid chloride forming reagent. Oxalyl chloride would find considerable greater commercial utility if it could be obtained both readily and economically.

This invention has as an object a new process for the preparation of oxalyl chloride. A further object is a new process for the preparation of phosgene. Other objects will appear hereinafter.

These objects are accomplished by the present invention wherein a carboxylic acid ester of tetrachloroethylene glycol, containing preferably only carbon, oxygen and chlorine, of an acid of up to two carbons, is heated at 35–130° C. with, as a catalyst, an activated charcoal or a compound of a trivalent element of atomic number of 7 to 33 in group VA, the three valences being satisfied by hydrocarbon radicals, except that no more than one valence can be satisfied by a group in which the carbon directly attached to said element is doubly bonded to oxygen or sulfur (i. e., a chalcogen of atomic number 8–16). The elements are nitrogen, phosphorus and arsenic (see 1951 Fisher Periodic Chart).

The formation of oxalyl chloride takes place at temperatures up to the boiling point of the halogenated ester in the presence of the catalyst. The oxalyl chloride is readily separated by distillation.

The following examples illustrate the preparation of oxalyl chloride by the process of this invention.

EXAMPLE I

*Oxalyl chloride from tetrachloroethylene carbonate*

A mixture of 50 g. (0.221 mol) of tetrachloroethylene carbonate, 10 ml. of chlorobenzene and about 0.1 g. of triethylamine was placed in the distillation pot of a fractionating column. The receiver portion of the still was vented through a "Dry-Ice" trap. The pot temperature was raised gradually during a three-hour period to 80–85° C. When the reflux temperature of the still head reached 62° C., distillation was effected, yielding 26.5 g. (0.2085 mol) of pure oxalyl chloride boiling at 62° C. Phosgene was collected in the "Dry-Ice" trap.

EXAMPLE II

The general procedure of Example I was repeated with the substitution of pyridine for triethylamine. Oxalyl chloride (81% yield) and phosgene were similarly obtained.

When triphenylphosphine, triphenylarsine, dimethylformamide, tetramethylthiuram disulfide, and charcoal ("Darco G–60" and "Columbia" charcoal) are substituted for the pyridine and triethylamine of the above examples, oxalyl chloride and phosgene in yields ranging from 63% to 92% are obtained.

Piperidine, cyclohexylamine, cyclohexanone oxime, sodium cyanide, potassium carbonate, sodium methoxide, litharge, silica gel (dehydrated) catalyzed the decomposition of tetrachloroethylene carbonate to oxalyl chloride and phosgene. However, they were much less effective and required a pot temperature of the order of 100–130° C. even to initiate production of oxalyl chloride.

Urea, thiourea, formamide, dibutyl, sulfide, dibutyl ether, dibutyl Cellosolve, quinone, mesityl oxide, capronitrile, tetramethylsuccinonitrile, phenothiazine, triphenylstibine, ferric chloride, boron trifluoride, zinc chloride, boric oxide and ferric oxide did not catalyze the transformation of tetrachloroethylene carbonate to oxalyl chloride and phosgene even at temperatures of about 165° C. (the boiling point of the carbonate) for short times. Likewise in the absence of any added compounds, the tetrachloroethylene carbonate did not change when heated to the boiling point for a short time, but on prolonged boiling (several hours) slow decomposition to oxalyl chloride and phosgene did occur.

EXAMPLE III

*Oxalyl chloride from tetrachloroethylene oxalate*

A mixture of 72.3 g. of tetrachloroethylene oxalate (prepared by the chlorination of ethylene oxalate), 50 ml. of chlorobenzene, and about 0.2 g. of activated charcoal ("Darco" G–60) was heated under total reflux by the procedure of Example I. The chloroester did not completely dissolve in chlorobenzene since it probably contained considerable polymeric ester with cyclic monomeric ester, but ebullition began when the pot temperature reached 70–80° C. and a reflux gradually built up with a boiling point of 62° C. at the head of the column. A distillate, B. P. 62–63° C., was collected over a period of about two hours until a sharp rise in head temperature indicated that chlorobenzene was about to come over. The yield of oxalyl chloride was 28.2 g. No evidence of phosgene formation was observed in this experiment.

EXAMPLE IV

*Oxalyl chloride from tetrachloroethylene bis-chlorocarbonate*

A mixture of 104 g. of crude tetrachloroethylene bis-chlorocarbonate and 70 ml. of chlorobenzene was treated with two drops of pyridine according to the procedure of Example I. A slow evolution of gas occurred at room temperature, and slight heating to 35° C. produced a smooth vigorous gas evolution. The temperature was gradually raised to 85° C. as the mixture was kept under total water-cooled reflux which allowed phosgene to escape but retained oxalyl chloride. The yield of oxalyl chloride which was finally distilled at 62–63° C. was 37.6 g.

EXAMPLE V

*Oxalyl chloride from tetrachloroethylene bis-trichloroacetate*

A mixture of tetrachloroethylene bis-trichloroacetate (50 gm.), chlorobenzene (50 cc.), and dimethylformamide (0.1 gm.) was heated at 100–120° C. The acid chlorides thus obtained were oxalyl chloride (B. P. 62° C.) and trichloroacetyl chloride (B. P. 118° C.). The acid chlorides reacted with aniline to form the anilides, M. P. 257° C. and 93–94° C. respectively.

This invention provides a process for the preparation of oxalyl chloride from carboxylic acid esters of tetrachloroethylene glycol. Although any carboxylic acid ester of this glycol which ester is free from active hydrogen can be used as the source of oxalyl chloride by the process of this invention, the carboxy acid portion contains no more than two carbons nor more than two carboxylic acid groups. Esters in which the acid portion is chlorinated, or at least will not undergo further chlorination by chlorine in the presence of light, are preferred. Examples of such compounds are the trichloroacetic acid esters of tetrachloroethylene glycol. Particularly useful for the purpose of this invention are tetrachloroethylene glycol esters, containing essentially only carbon, oxygen, and chlorine, of carboxylic acids, preferably dibasic, of up to two carbons and especially esters in which the tetrachloroethylene dioxy unit, —OCCl$_2$CCl$_2$O—, is attached to carboxy carbon of a one to two carbon dibasic acid, or the half acid chloride of such acid, such as, carbonic, chlorocarbonic and oxalic acid.

The tetrachloroethylene glycol esters used in the process of this invention to give oxalyl chloride are suitably obtained by the replacement by chlorine of all of the hydrogens of the ethylene glycol portion of such esters with carboxylic acids, particularly those of dibasic acids or their half acid chlorides. Compounds of this class are ethylene carbonate, ethylene oxalate and ethylene chlorocarbonate. The complete chlorination of these compounds is accomplished by the use of actinic light with excess chlorine generally in an inert solvent such as carbon tetrachloride at a temperature of 75–125° C. for a time which is sufficient for the replacement of all hydrogens by chlorine. The time is generally 10–30 hours and is dependent upon the temperature. The completeness of halogenation is observed by noting the persistence for at least 30 minutes of dissolved chlorine after chlorine addition is stopped, or by obtaining the theoretical weight gain or by analysis of the chlorinated product. The preparation of suitable esters is disclosed in greater detail in our copending, concurrently filed application Serial No. 519,645 the disclosure of which is hereby incorporated.

Although ethylene glycol esters of other acids, either monobasic or dibasic, can also be employed to produce tetrachloroethylene esters by chlorination, in these instances the chlorination route may be wasteful of chlorine if the carboxylic half of the ester is also susceptible to chlorination.

The rearrangement of the tetrachloroethylene glycol esters to oxalyl chloride takes place in the presence of small amounts, 0.01 to 10%, of a catalyst free from active hydrogen. Tertiary amines are readily available catalysts. Of the tertiary amines, those which are hydrocarbon except for the nitrogen, e. g., tripropylamine, triamylamine, dimethylaniline, pyridine and quinoline, are preferred. Also useful are the tertiary phosphines and arsines. Amides of secondary amines are likewise operable. These catalysts include those of the formula RR'R''M wherein at least two of the R's are hydrocarbon generally of up to six carbons with optionally one of the R's being a radical of up to 6 carbons directly attached to the element M by carbon which is also directly bonded to oxygen or sulfur, and M is N, P, or As, i. e., an element of atomic number 7 to 33 in group VA of the periodic table (Fisher). A further catalyst also included is activated charcoal of vegetable origin, particularly one having a large surface area.

The compounds employed as catalysts, except for the charcoals, are generally soluble to some extent in the reaction system. When compounds which have low solubility in the tetrachloroethylene ester are used, inert diluents can be employed. The reaction takes place in a liquid medium and such inert diluents as chlorobenzene can be present.

The time of reaction depends on the temperature and the specific catalyst employed. Times of from an hour to several hours are generally used at temperatures of 35–130° C. With the preferred catalysts, reaction is rapid at 60–80° C. This is a convenient temperature range since the oxalyl chloride, B. P. 62° C., is readily isolated by distillation.

When the tetrachloroethylene ester is one of an acid of one carbon as of the carbonate or chlorocarbonate, phosgene is also produced. This compound is readily separated from oxalyl chloride by distillation. Phosgene is of considerable importance in synthetic organic chemistry and is employed commercially in such uses as the synthesis of isocyanates from primary amines.

Oxalyl chloride is readily obtained in high yield by the process of this invention. Oxalyl chloride is a reactive compound. It reacts with hydrogen bearing amines. With diamines such as hexamethylenediamine a high molecular weight fiber-forming polyamide is obtained. It reacts with organic compounds in various ways, depending upon the compound and the reaction conditions; for example, oxalyl chloride reacts with alcohols to yield oxalic esters. It can act as a chlorinating agent, e. g., to convert a carbonyl group to a dichloromethane group, or a carboxylic acid to the corresponding acid chloride. It can also act as a dehydrating agent, e. g., to convert dibasic acids to anhydrides.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for the preparation of oxalyl chloride which comprises heating tetrachloroethylene carbonate at a temperature within the range 60° C.–80° C. in contact with activated carbon of vegetable origin and separating the resulting oxalyl chloride.

2. Process for the preparation of oxalyl chloride which comprises heating a tetrachloroethylene glycol ester, containing only carbon, oxygen, and chlorine, of a dibasic carboxylic acid of one to two carbons at a temperature within the range 60° C.–80° C. in contact with activated carbon of vegetable origin and separating the resulting oxalyl chloride.

3. Process for the preparation of oxalyl chloride which comprises heating a tetrachloroethylene glycol ester, containing only carbon, oxygen, and chlorine, of a carboxylic acid of one to two carbons at a temperature within the range 60° C.–80° C. in contact with activated carbon of vegetable origin and separating the resulting oxalyl chloride.

4. Process for the preparation of oxalyl chloride which comprises heating a tetrachloroethylene glycol ester, containing only carbon, oxygen, and chlorine, of a carboxylic acid of one to two carbons at a temperature within the range 60° C.–80° C. in contact with pyridine and separating the resulting oxalyl chloride.

5. Process for the preparation of oxalyl chloride which comprises heating a tetrachloroethylene glycol ester, containing only carbon, oxygen, and chlorine, of a carboxylic acid of one to two carbons at a temperature within the range 60° C.–80° C. in contact with a tertiary amine free of active hydrogen and separating the resulting oxalyl chloride.

6. Process for the preparation of oxalyl chloride which comprises heating a tetrachloroethylene glycol ester, containing only carbon, oxygen, and chlorine, of a carboxylic acid of one to two carbons at a temperature within the range 60° C.–80° C. in contact with a compound, free from active hydrogen, of a trivalent element of group VA and atomic number no greater than 33 wherein all valences of said element are satisfied by hydrocarbon radicals provided that one of said valences may be bonded to carbon doubly bonded to chalcogen of atomic number no greater than 16.

7. Process for the preparation of oxalyl chloride which comprises heating a tetrachloroethylene glycol ester, containing only carbon, oxygen, and chlorine, of a carboxylic acid of one to two carbons at a temperature within the range 60° C.–80° C. in contact with a catalyst free from active hydrogen and of the class consisting of activated charcoal of vegetable origin, tertiary amines, amides of secondary amines, tertiary phosphines and tertiary arsines.

8. Process for the preparation of oxalyl chloride which comprises bringing a tetrachloroethylene glycol ester of a carboxylic acid containing not more than two carbon atoms, which ester is free from active hydrogen, in contact with a catalyst as described in claim 7 at a temperature of 35° C.–130° C. and isolating the resulting oxalyl chloride.

9. Process of claim 8 where the catalyst is an activated charcoal of vegetable origin.

10. Process of claim 8 where the catalyst is a tertiary amine free from active hydrogen.

11. In the preparation of oxalyl chloride by heating a tetrachloroethylene glycol ester of a carboxylic acid containing not more than two carbon atoms and free from active hydrogen the improvement wherein the ester is heated in contact with a catalyst of the class described in claim 7.

References Cited in the file of this patent

FOREIGN PATENTS 330,511   Great Britain _____ June 2, 1930

OTHER REFERENCES

Hood et al.: J. Phys. Chem., vol. 23, pp. 508–509.